(12) United States Patent
Yu et al.

(10) Patent No.: US 9,390,712 B2
(45) Date of Patent: Jul. 12, 2016

(54) MIXED SPEECH RECOGNITION

(71) Applicant: Microsoft Corporation, Redmond, WA (US)

(72) Inventors: Dong Yu, Bothell, WA (US); Chao Weng, Atlanta, GA (US); Michael L. Seltzer, Seattle, WA (US); James Droppo, Carnation, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 166 days.

(21) Appl. No.: 14/223,468

(22) Filed: Mar. 24, 2014

(65) Prior Publication Data

US 2015/0269933 A1    Sep. 24, 2015

(51) Int. Cl.
*G10L 15/16* (2006.01)
*G10L 15/06* (2013.01)
*G10L 15/20* (2006.01)

(52) U.S. Cl.
CPC .............. *G10L 15/16* (2013.01); *G10L 15/063* (2013.01); *G10L 15/20* (2013.01)

(58) Field of Classification Search
CPC ...................................................... G10L 15/16
See application file for complete search history.

(56) References Cited

U.S. PATENT DOCUMENTS

| | | | | |
|---|---|---|---|---|
| 5,737,485 A * | 4/1998 | Flanagan | ................. | G10L 15/16 704/232 |
| 5,751,904 A * | 5/1998 | Inazumi | .................. | G10L 15/16 704/232 |
| 7,464,029 B2 | 12/2008 | Visser et al. | | |
| 8,515,096 B2 * | 8/2013 | Seltzer | ................ | G10L 21/0272 381/94.1 |
| 9,099,096 B2 * | 8/2015 | Yoo | ..................... | G10L 21/0272 |
| 2003/0233233 A1 * | 12/2003 | Hong | ....................... | G10L 15/20 704/256.5 |
| 2004/0260550 A1 * | 12/2004 | Burges | .................... | G10L 17/00 704/259 |
| 2006/0053002 A1 * | 3/2006 | Visser | ................. | G10L 21/0272 704/200 |
| 2007/0071206 A1 * | 3/2007 | Gainsboro | .......... | H04M 3/2281 379/168 |
| 2007/0124264 A1 * | 5/2007 | Cecchi | ................. | G06K 9/0057 706/15 |
| 2013/0132082 A1 | 5/2013 | Smaragdis | | |
| 2013/0138436 A1 | 5/2013 | Yu et al. | | |

(Continued)

FOREIGN PATENT DOCUMENTS

WO        2013149123 A1    10/2013

OTHER PUBLICATIONS

Andersen, Ove, and Paul Dalsgaard. "Language-identification based on cross-language acoustic models and optimised information combination." EUROSPEECH. 1997.*

(Continued)

*Primary Examiner* — Brian Albertalli
(74) *Attorney, Agent, or Firm* — Alin Corie; Sandy Swain; Micky Minhas

(57) ABSTRACT

The claimed subject matter includes a system and method for recognizing mixed speech from a source. The method includes training a first neural network to recognize the speech signal spoken by the speaker with a higher level of a speech characteristic from a mixed speech sample. The method also includes training a second neural network to recognize the speech signal spoken by the speaker with a lower level of the speech characteristic from the mixed speech sample. Additionally, the method includes decoding the mixed speech sample with the first neural network and the second neural network by optimizing the joint likelihood of observing the two speech signals considering the probability that a specific frame is a switching point of the speech characteristic.

20 Claims, 6 Drawing Sheets

(56) References Cited

U.S. PATENT DOCUMENTS

| | | | | |
|---|---|---|---|---|
| 2014/0056432 | A1* | 2/2014 | Loui | G10L 25/51 381/56 |
| 2014/0058982 | A1* | 2/2014 | Loui | G10L 25/51 706/12 |
| 2014/0358831 | A1* | 12/2014 | Adams | G06N 7/005 706/12 |
| 2015/0149165 | A1* | 5/2015 | Saon | G10L 17/18 704/232 |

OTHER PUBLICATIONS

Liu, Zhu, et al. "Audio feature extraction and analysis for scene classification." Multimedia Signal Processing, 1997., IEEE First Workshop on. IEEE, 1997.*

Hild, Hermann, and Alex Waibel. "Multi-speaker/speaker-independent architectures for the multi-state time delay neural network." Acoustics, Speech, and Signal Processing, 1993. ICASSP-93., 1993 IEEE International Conference on. vol. 2. IEEE, 1993.*

Heigold, Georg, et al. "Multilingual acoustic models using distributed deep neural networks." Acoustics, Speech and Signal Processing (ICASSP), 2013 IEEE International Conference on. IEEE, 2013.*

Hyvärinen, Aapo. "Independent component analysis in the presence of gaussian noise by maximizing joint likelihood." Neurocomputing 22.1 (1998): 49-67.*

Barker, et al., "Speech Fragment Decoding Techniques for Simultaneous Speaker Identification and Speech Recognition", In Journal Computer Speech and Language, vol. 24, Issue 1, Jan. 2010, pp. 94-111.

Cooke, et al., "An Audio-Visual Corpus for Speech Perception and Automatic Speech Recognition", In Journal of Acoustical Society of America, vol. 120, No. 5, Nov. 2006, pp. 2421-2424.

Cooke, et al., "Monaural Speech Separation and Recognition Challenge", In Journal Speech and Language, vol. 24, Issue 1, Jan. 2010, pp. 1-15.

Dahl, et al., "Context-Dependent Pre-Trained Deep Neural Networks for Large-Vocabulary Speech Recognition", In IEEE Transactions on Audio, Speech, and Language Processing, vol. 20, Issue 1, Jan. 2012, pp. 30-42.

Ghahramani, et al., "Factorial Hidden Markov Models", In Proceedings of Machine Learning, vol. 29, Issue 2-3, Nov. 1, 1997, pp. 245-273, The Netherlands.

Grais, et al., "Deep Neural Networks for Single Channel Source Separation", In Proceedings of arXiv preprint arXiv, Nov. 12, 2013, 5 pages.

Hinton, et al., "Deep Neural Networks for Acoustic Modeling in Speech Recognition", In IEEE Signal Processing Magazine, vol. 29, No. 6, Nov. 2012, pp. 2-17.

Kristjansson, et al., "Super-Human Multi-Talker Speech Recognition: The IBM 2006 Speech Separation Challenge System", In Proceedings of 9th International Conference on Spoken Language Processing, Sep. 17, 2006, 4 pages.

Li, et al., "An Overview of Noise-Robust Automatic Speech Recognition", In IEEE Transactions on Audio, Speech, and Language Processing, vol. 10, No. 10, Dec. 2013, pp. 1-33, Paderborn, Germany.

Li, et al., "Deep Neural Networks for Syllable based Acoustic Modeling in Chinese Speech Recognition", In Proceedings of Signal and Information Processing Association Annual Summit and Conference, Oct. 29, 2013, 4 pages.

Li, et al., "Improving Robustness of Deep Neural Networks via Spectral Masking for Automatic Speech Recognition", In IEEE Workshop on Automatic Speech Recognition and Understanding, Dec. 8, 2013, 1 pages.

Li, et al., "Improving Wideband Speech Recognition Using Mixed-Bandwidth Training Data in Cd-Dnn-Hmm", In IEEE Spoken Language Technology Workshop, Dec. 2, 2012, pp. 131-136.

Lippmann, et al., "Multi-Style Training for Robust Isolated-Word Speech Recognition", In IEEE International Conference on Acoustics, Speech, and Signal Processing, Apr. 6, 1987, pp. 705-708.

Lu, et al., "Joint Uncertainty Decoding for Noise Robust Subspace Gaussian Mixture Models", In IEEE Transactions on Audio, Speech, and Language Processing, vol. 21, No. 9, Sep. 2013, pp. 1791-1804.

M.R., et al., "Enhancement of Harmonic Content of Speech Based on a Dynamic Programming Pitch Tracking Algorithm", In Proceedings of 9th International Conference on Spoken Language Processing, Sep. 17, 2006, 5 pages.

Ming, et al., "Combining Missing-Feature Theory, Speech Enhancement and Speaker-Dependent/-Independent Modeling for Speech Separation", In Journal Computer Speech and Language, vol. 24, Issue 1, Jan. 2010, 4 pages.

Mohamed, et al., "Acoustic Modelling Using Deep Belief Networks", In IEEE Transactions on Audio, Speech, and Language Processing, vol. 20, Issue 1, Jan. 2012, pp. 14-22.

Narayanan, et al., "Ideal Ratio Mask Estimation Using Deep Neural Networks for Robust Speech Recognition", In IEEE International Conference on Acoustics, Speech and Signal Processing, May 26, 2013, pp. 7092-7096.

Rennie, et al., "Single-Channel Multitalker Speech Recognition", In IEEE Signal Processing Magazine, Nov. 2010, pp. 66-80.

Schmidt, et al., "Single-Channel Speech Separation using Sparse Non-Negative Matrix Factorization", In Proceedings of 9th International Conference on Spoken Language Processing, Sep. 17, 2006, 4 pages.

Seide, et al., "Feature Engineering in Context-Dependent Deep Neural Networks for Conversational Speech Transcription", In IEEE Workshop on Automatic Speech Recognition and Understanding, Dec. 11, 2011, pp. 24-29.

Seltzer, et al., "An Investigation of Deep Neural Networks for Noise Robust Speech Recognition", In IEEE International Conference on Acoustics, Speech and Signal Processing, May 26, 2013, pp. 7398-7042.

Shaoa, et al., "A Computational Auditory Scene Analysis System for Speech Segregation and Robust Speech Recognition", In Journal Computer Speech and Language, vol. 24, Issue 1, Jan. 2010, pp. 77-93.

Swietojanski, et al., "Hybrid Acoustic Models for Distant and Multichannel Large Vocabulary Speech Recognition", In IEEE Workshop on Automatic Speech Recognition and Understanding, Dec. 8, 2013, 6 pages.

Virtanen, Tuomas, "Speech Recognition Using Factorial Hidden Markov Models for Separation in the Feature Space", In Proceedings of 9th International Conference on Spoken Language Processing, Sep. 17, 2006, 4 pages.

Weiss, et al., "Monaural Speech Separation using Source-Adapted Models", In IEEE Workshop on Applications of Signal Processing to Audio and Acoustics, Oct. 21, 2007, pp. 114-117, New Paltz, NY, USA.

Weng, Chao, "Towards Robust Conversational Speech Recognition and Understanding", Published on: Jan. 23, 2014, Available at: http://research.microsoft.com/apps/video/default.aspx?id=208338&l=i, pp. 1-2, Redmond, WA, USA.

Yu, et al., "Exploiting Sparseness in Deep Neural Networks for Large Vocabulary Speech Recognition", In IEEE International Conference on Acoustics, Speech and Signal Processing, Mar. 25, 2012, pp. 4409-4412.

Yu, et al., "Feature Learning in Deep Neural Networks—Studies on Speech Recognition Tasks", In Proceedings of Computation and Language, Mar. 8, 2013, pp. 1-9.

"International Search Report and Written Opinion Issued in PCT Patent Application No. PCT/US2015/021363", Mailed Date: May 29, 2015, 13 Pages.

Li, et al., "A Neural Network Based Regression Approach for Recognizing Simultaneous Speech", In Proceedings of the 5th International Workshop on Machine Learning for Multimodal Interaction, Sep. 8, 2008, pp. 110-118.

(56) References Cited

OTHER PUBLICATIONS

Shahamiri, et al., "Real-Time Frequency-Based Noise-Robust Automatic Speech Recognition Using Multi-Nets Artificial Neural Networks: A Multi-Views Multi-Learners Approach", In Neurocomputing, vol. 129, Apr. 1, 2014, pp. 199-207.

Hampshire, et al., "Connectionist Architectures for Multi-Speaker Phoneme Recognition", In Advances in Neural Information Processing Systems 2, Jun. 1, 1990, pp. 203-210.

Weng, et al., "Single-Channel Mixed Speech Recognition Using Deep Neural Networks", In Proceedings of the IEEE International Conference on Acoustics, Speech and Signal Processing (ICASSP), May 4, 2014, pp. 5632-5636.

"International Preliminary Report on Patentability Issued in PCT Application No. PCT/US2015/021363", Mailed Date: Oct. 14, 2015, 9 Pages.

\* cited by examiner

500

MIXED SPEECH RECOGNITION

BACKGROUND

While progress has been made in improving the noise robustness of speech recognition systems, recognizing speech in the presence of a competing talker (mixed speech) remains a challenge. For the case of single-microphone speech recognition in the presence of a competing talker, researchers apply a variety of techniques on a mixed speech sample and make comparisons between them. These techniques include model-based approaches that use factorial Gaussian Mixture Models-Hidden Markov Models (GMM-HMM) for the interaction between the target and competing speech signals, and their temporal dynamics. With this technique, a joint inference, or decoding, identifies the two most likely speech signals, or spoken sentences.

In computational auditory scene analysis (CASA) and "missing feature" approaches, segmentation rules operate on low-level features to estimate a time-frequency mask that isolates the signal components belonging to each speaker. This mask may be used to reconstruct the signal or to inform the decoding process. Other approaches use non-negative matrix factorization (NMF) for separation and pitch-based enhancement.

In one approach, a separation system uses factorial GMM-HMM generative models with 256 Gaussians to model the acoustic space for each speaker. While this useful for a small vocabulary, it is a primitive model for a large vocabulary task. With a larger number of Gaussians, performing inference on the factorial GMM-HMM becomes computationally impractical. Further, such a system assumes the availability of speaker-dependent training data and a closed set of speakers between training and test, which may be impractical for large numbers of speakers.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

A system and method recognize mixed speech from a source. The method includes training a first neural network to recognize the speech signal of the speaker with a higher level of a speech characteristic from a mixed speech sample. The method also includes training a second neural network to recognize the speech signal of the speaker with a lower level of a speech characteristic from the mixed speech sample. Additionally, the method includes decoding the mixed speech sample with the first neural network and the second neural network by optimizing the joint likelihood of observing the two speech signals considering the probability that a specific frame is a switching point of the power of the speakers.

Embodiments include one or more computer-readable storage memory devices for storing computer-readable instructions. The computer-readable instructions when executed by one or more processing devices. The computer-readable instructions include code configured to train a first neural network to recognize a higher level of a speech characteristic in a first speech signal from a mixed speech sample. A second neural network is trained to recognize a lower level of the speech characteristic in a second speech signal from the mixed speech sample. A third neural network is trained to estimate a switching probability for each frame. The mixed speech sample is decoded with the first neural network, the second neural network, and the third neural network by optimizing the joint likelihood of observing the two speech signals, the joint likelihood meaning a probability that a specific frame is a switching point of the speech characteristic.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
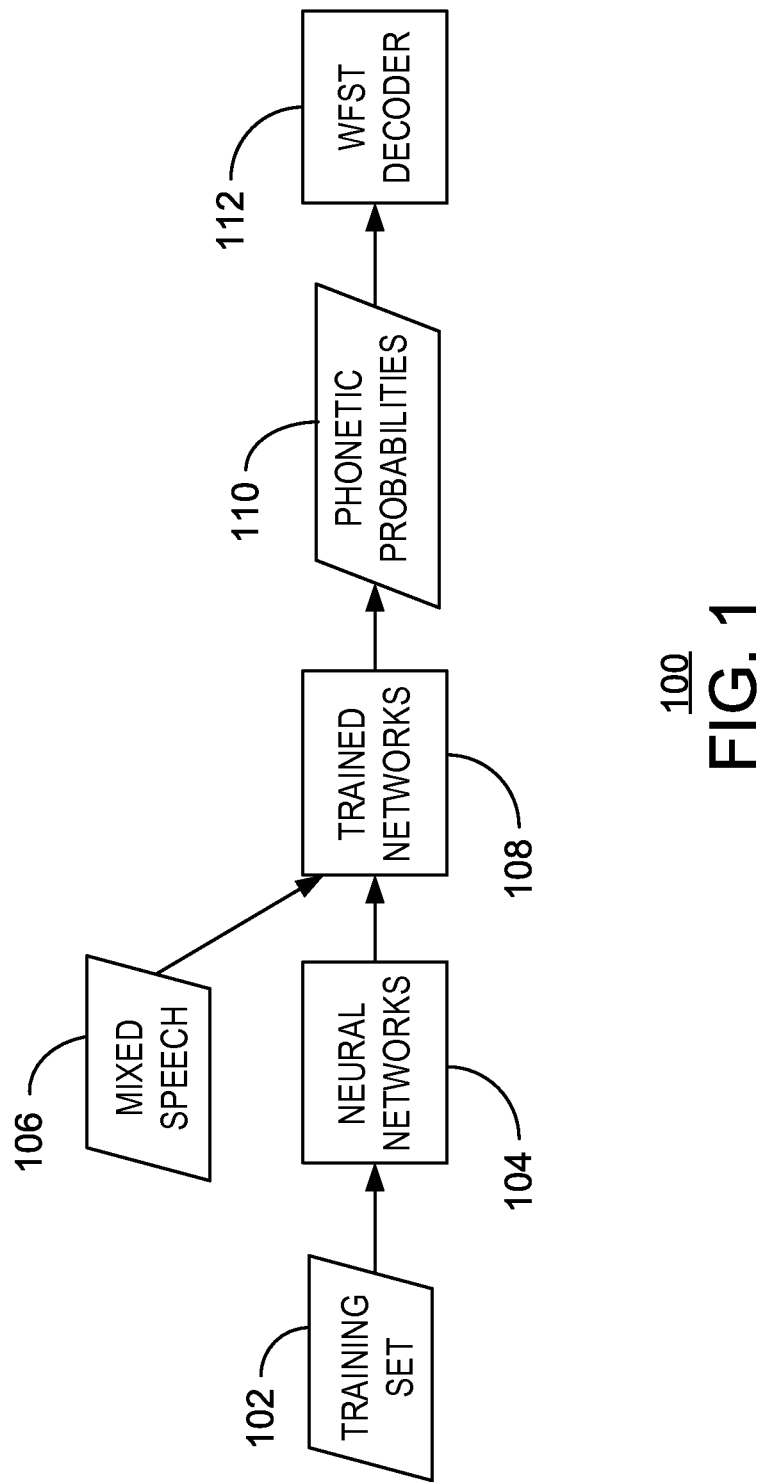
FIG. 1 is a data flow diagram of an example system for single channel mixed speech recognition, according to embodiments described herein.

As a preliminary matter, some of the Figures describe concepts in the context of one or more structural components, variously referred to as functionality, modules, features, elements, or the like. The various components shown in the Figures can be implemented in any manner, such as software, hardware, firmware, or combinations thereof. In some embodiments, various components reflect the use of corresponding components in an actual implementation. In other embodiments, any single component illustrated in the Figures may be implemented by a number of actual components. The depiction of any two or more separate components in the Figures may reflect different functions performed by a single actual component. FIG. 1, discussed below, provides details regarding one system that may be used to implement the functions shown in the Figures.

Other Figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may include communication media such as transmission media for wireless signals and the like.

Neural networks are computational models attempting to mimic activity in the brains of animals. In neural networks, interconnected systems compute values from inputs by feeding information through the network. These systems are interconnected, similar to interconnections between the brain's neurons. A deep neural network (DNN) is typically a network with more than one hidden layers, where the layers are fully connected. In other words, all the neurons in a layer are interconnected to all the neurons in the succeeding layer.

In speech recognition, a set of input neurons may be activated by the speech signal of an input frame of mixed speech. The input frames may be processed by the neurons in the first layer, and passed on to neurons in other layers, that also process their inputs and pass on their outputs. The output of the neural network is generated by output neurons, which specify the probability that specific phones or subphone units are observed.

High-resolution features are typically used by speech separation systems, but a conventional GMM-HMM automatic speech recognition (ASR) system is incapable of effectively modeling the high-resolution features. As such, researchers typically separate the processing of speech separation and speech recognition when the conventional GMM-HMM-based ASR system is used.

However, neural network-based systems have shown an advantage with processing spectral-domain features, in comparison to processing cepstral-domain features. Further, neural networks have shown robustness to speaker variation and environmental distortions. In embodiments of the claimed subject matter, a unified neural network-based system can perform both the separation and recognition processing for two-talker speech. Advantageously, the neural network may do this in a manner that is more likely to scale up than conventional ASR systems.

FIG. 1 is a data flow diagram of an example system 100 for single channel mixed speech recognition, according to embodiments described herein. In the system 100, training sets 102 are input to multiple neural networks 104. The neural networks 104 are trained using the training sets 102, producing the trained networks 106. Mixed speech frames 108 are input to the trained networks 106, producing phonetic probabilities 110. The phonetic probabilities 110 represent a set of likelihoods that specific phone or subphone units are observed in the signal. In one embodiment, the phonetic probabilities 110 are input to weighted finite-state (WFST) transducers 112, which perform joint decoding to select the spoken words. The system 100 includes several methods for co-channel speech recognition that combine multi-style training with different objective functions defined for the multi-talker task.

Example implementations have demonstrated noise robustness to the interference of the competing talker. One implementation achieves 19.7% overall word error rate (WER), which is 1.9% absolute improvement over state-of-the-art systems. Advantageously, embodiments of the claimed subject accomplish this with less complexity and fewer assumptions.

1. INTRODUCTION

Embodiments of the claimed subject matter perform single-channel mixed speech recognition using deep neural networks (neural networks 104). By using multi-style training strategy on artificially mixed speech data, e.g., mixed speech frames 108, several different training setups enabling DNN systems to generalize corresponding similar patterns. Additionally, the WFST decoder 112 is a joint decoder that works with trained neural networks 104.

2. DNN MULTI-STYLE TRAINING WITH MIXED SPEECH

Figure 2:
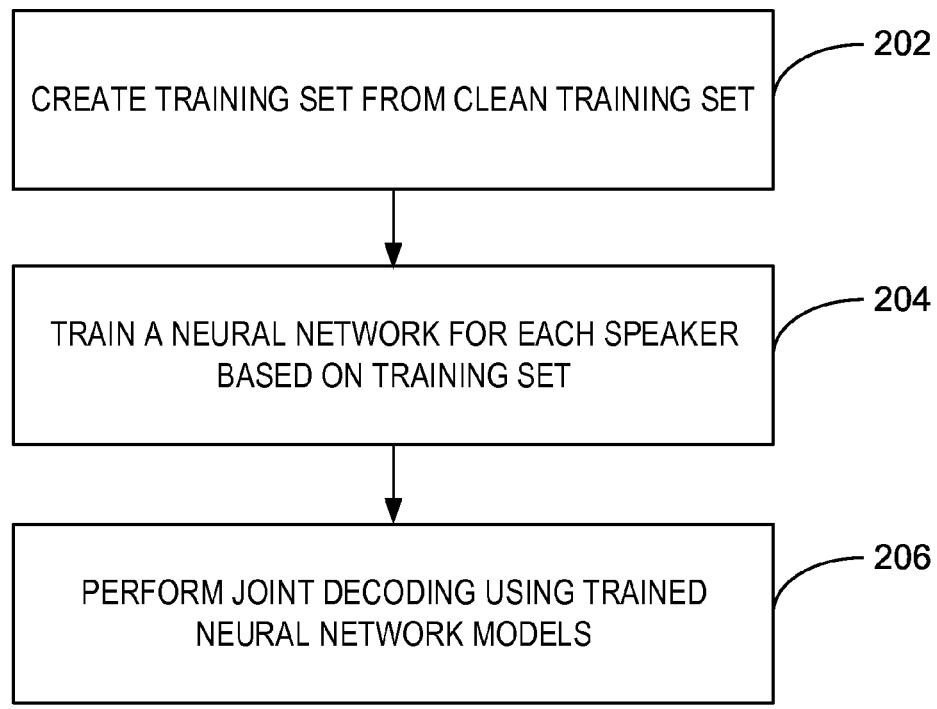
FIG. 2 is a process flow diagram of a method for single channel mixed speech recognition, according to embodiments described herein.

FIG. 2 is a process flow diagram of a method 200 for single channel mixed speech recognition, according to embodiments described herein. It is understood that the process flow diagram only represents techniques of the claimed subject matter, and are not necessarily representative of the sequence. The method 200 may be performed by the system 100, and begins at block 202, where the training set 102 is created from a clean training set. Although a neural network-based acoustic model has proven to be more robust to environmental distortions than conventional systems, this robustness does not hold well when there are greater distortions between training set 102 and the mixed speech frames 108. As such, presenting examples of representative variations to the neural networks 104 during training helps the trained networks 106 generalize to more corrupted speech.

A neural network-based model trained on single-speaker speech generalizes poorly. However, embodiments of the claimed subject matter circumvent this issue by using a multi-style training strategy. In this strategy, the clean training data is modified to be representative of the expected speech. In an example training set 102, a clean, single-talker speech database is "corrupted" with samples of competing speech from other talkers at various volumes, energies, and so on. At block 204, neural networks 104 are trained with this modified training data, which includes multi-condition waveforms. Advantageously, multi-condition data can be used to create trained networks 106 that can separate the sound signals in multi-talker speech. In embodiments, a neural network 104 may be trained for each of the speakers.

At block 206, a joint decoding may be performed. In one embodiment, a WFST decoder is modified to decode speech for multiple talkers.

2.1. High and Low Energy Signal Models

In each mixed-speech utterance with multiple speech signals, it is assumed that one signal is the target speech, and one is the interference. The labeling is somewhat arbitrary as the system decodes both signals. One embodiment uses assumptions about the energy of the speech signals. In this embodiment, it is assumed that one signal has higher average energy than the other. Under this assumption, it is possible to identify the target speech as either the higher energy signal [positive signal to noise ratio (SNR)] or the lower energy signal (negative SNR). Thus, two neural networks 104 are used: given a mixed-speech input, one network is trained to recognize the higher energy speech signal while the other one is trained to recognize the lower energy speech signal.

Figure 3:
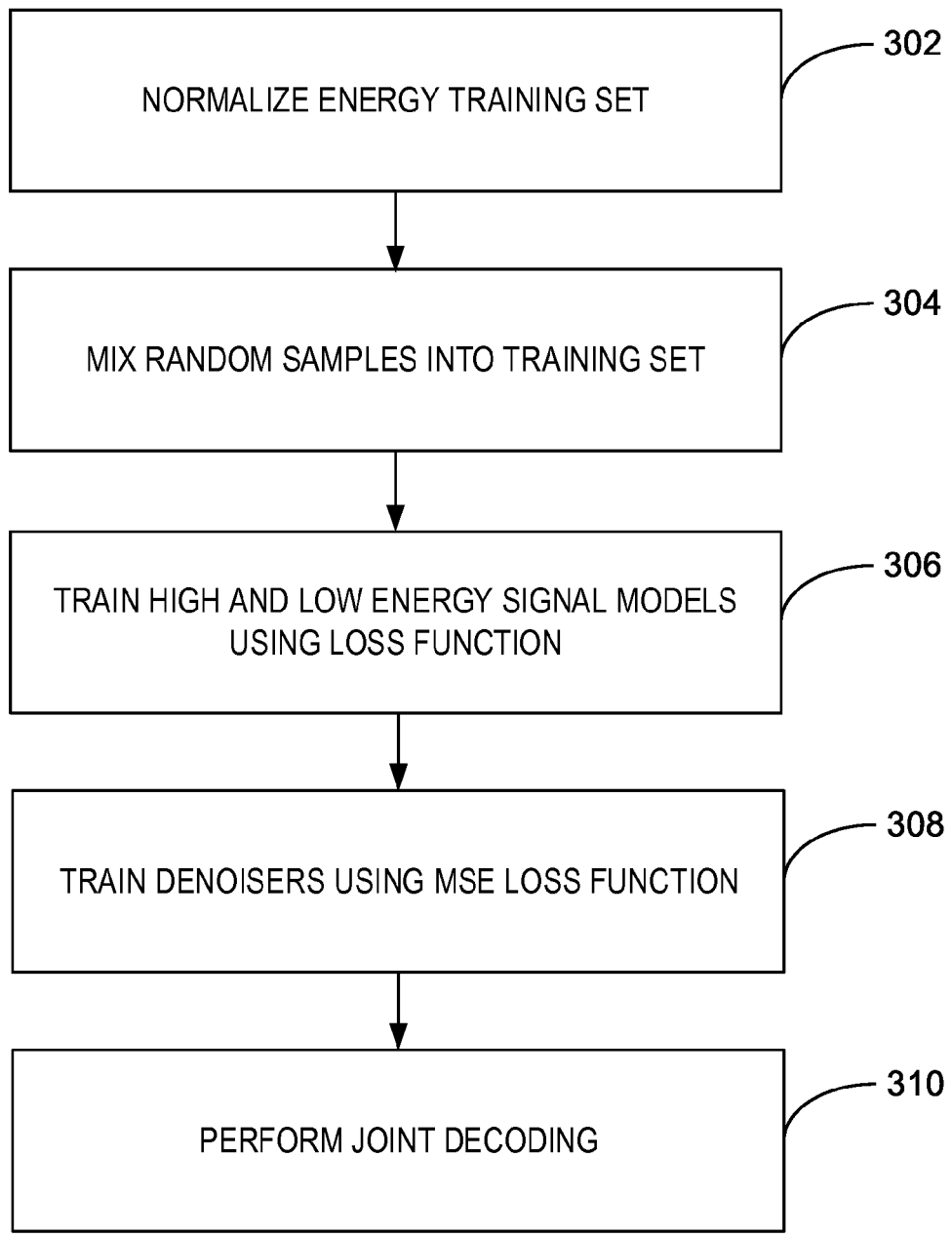
FIG. 3 is a process flow diagram of a method for single channel mixed speech recognition, according to embodiments described herein.

FIG. 3 is a process flow diagram of a method for single channel mixed speech recognition, according to embodiments described herein. It is understood that the process flow diagram only represents techniques of the claimed subject matter, and are not necessarily representative of the sequence. The method 300 may be performed by the system 100, and begins at block 302, where the system 100 normalizes the energy of the training set 102. Given a clean training dataset, $\chi$, energy normalization is performed so each speech utterance in the data set has the same power level. At block 304, random samples are mixed into the training set 102. To simulate acoustical environments where the target speech signal has higher or lower average energy, another signal is randomly selected from the training set 102, its amplitude is scaled appropriately, and added to the training set 102. In this way, the training set 102 is modified to create two multi-condition datasets, denoted by $\chi_H, \chi_L$ for the high and low energy data.

At block 306, a neural network is 104 are trained for each of $\chi_H, \chi_L$, generating two trained networks 106. For the high energy target speaker, the neural networks 104 may be trained with the loss function, $$\mathcal{L}_{CE}(\theta) = - \sum_{x_t \in \mathcal{X}_H} \log p(s_j^H \mid x_t; \theta), \quad (1)$$

where $s_j^H$ is the reference senone label at $t^{th}$ frame. It is noted that the term, senone labels, comes from the alignments on the clean data. This was useful in obtaining good performance in example implementations. Similarly, the neural network 104 for the low energy target speaker can be trained on the dataset $\chi_L$. Additionally, with the two datasets, $\chi_L$ and $\chi_H$, it is possible to train neural networks 104 as denoisers using the minimum square error (MSE) loss function, $$\mathcal{L}_{MSE}(\theta) = \sum_{x_t \in \mathcal{X}_H} |\hat{y}(x_t; \theta) - y_t|^2, \, y_t \in \mathcal{X}, \quad (2)$$

where $y_t \in \chi$ is the corresponding clean speech features and $\hat{y}(x_t; \theta)$ is the estimation of the uncorrupted inputs using deep denoiser. Similarly, the denoiser for the low energy target speaker can be trained on the dataset $\chi_L$. At 310, joint decoding may be performed.

2.2. High and Low Pitch Signal Models

One potential issue with the above training strategy based on the average high and low energy speech signals is that the trained models may perform poorly when mixed signals have similar average energy levels, i.e. near 0 dB SNR. In terms of training, the problem becomes ill-defined because for the same mixed-speech input the training label has contradictory values (can be the labels from both the higher energy and lower energy speakers). However, it is less likely that two speakers speak with the same pitch. Thus, in another embodiment, neural networks 104 are trained to recognize the speech with the higher or lower pitch. In this embodiment, a single training set 102 is created, $\chi_p$, from original clean dataset $\chi$ by randomly choosing an interfering speech signal and mixing it with the target speech signal. The training also includes a pitch estimate for both the target and interfering speech signals, which is used to select labels for the training. The loss function for training the neural networks 104 for the high pitch speech signals is thus, $$\mathcal{L}_{CE}(\theta) = - \sum_{x_t \in \mathcal{X}_P} \log p(s_j^{HP} \mid x_t; \theta), \quad (3)$$

where $s_j^{HP}$ is the reference senone label obtained from the alignments on the speech signal with the higher average pitch. Similarly, a neural network 104 for the lower pitch speech signals can be trained with the senone alignments of the speech signal with the lower average pitch.

2.3. Instantaneous High and Low Energy Signal Models

The neural networks 104 may also be trained based on the instantaneous energy in each frame 108. Even an utterance with an average energy of 0 dB will have non-zero instantaneous SNR values in each frame, which means there is no ambiguity in the labeling. The training set, $\chi_I$, may be created by mixing speech signals and computing the instantaneous frame energies in the target and interfering signal. The loss function for the instantaneous high energy signal is given by, $$\mathcal{L}_{CE}(\theta) = - \sum_{x_t \in \mathcal{X}_I} \log p(s_j^{IH} \mid x_t; \theta), \quad (4)$$

where $s_j^{1H}$ corresponds to the senone label from the signal source which contains higher energy at frame t. In this scenario, a frame-based energy is used, rather than an utterance-based energy as the criterion for separation. As such, there is uncertainty as to which output corresponds to the target or interferer from frame 108 to frame 108. For example, the target speaker can have higher energy in one frame and lower energy in the next frame.

3. JOINT DECODING WITH DNN MODELS

For the neural networks 104 based on instantaneous energy, each of the two trained networks 106 determine which outputs belong to which speaker at each frame 108. To do this, a joint decoder takes the posterior probability estimates, e.g., phonetic probabilities 110, from the trained networks 106 to jointly find best two state sequences, one for each speaker. The standard recipe for creating the decoding graph in the WFST framework can be written as, $$HCLG = \min(det(H \circ C \circ L \circ G)), \quad (5)$$

where H, C, L and G represent the HMM structure, phonetic context-dependency, lexicon and grammar respectively, and ○ is WFST composition. The input labels of the HCLG are the identifiers of context-dependent HMM states (senone labels), and the output labels represent words. Denoted by $\theta^H$ and $\theta^L$, are the instantaneous high and low energy signal trained networks. The task of the joint decoder is to find best two state sequence in the 2-D joint state space such that the sum of each state-sequence log-likelihood is maximized, $$(s^{1*}, s^{2*}) = \mathrm{argmax}_{(s^1, s^2) \in \{s^1 \times s^2\}} p(x_{1:T}|s^1; \theta^H, \theta^L) \cdot p(x_{1:t}|s^2; \theta^H, \theta^L). \tag{6}$$

The decoding algorithm performs joint token passing on the two HCLG decoding graphs. The difference in token passing between joint decoding and conventional decoding is that in joint decoding, each token is associated with two states in the decoding graph, rather than one.

Figure 4:
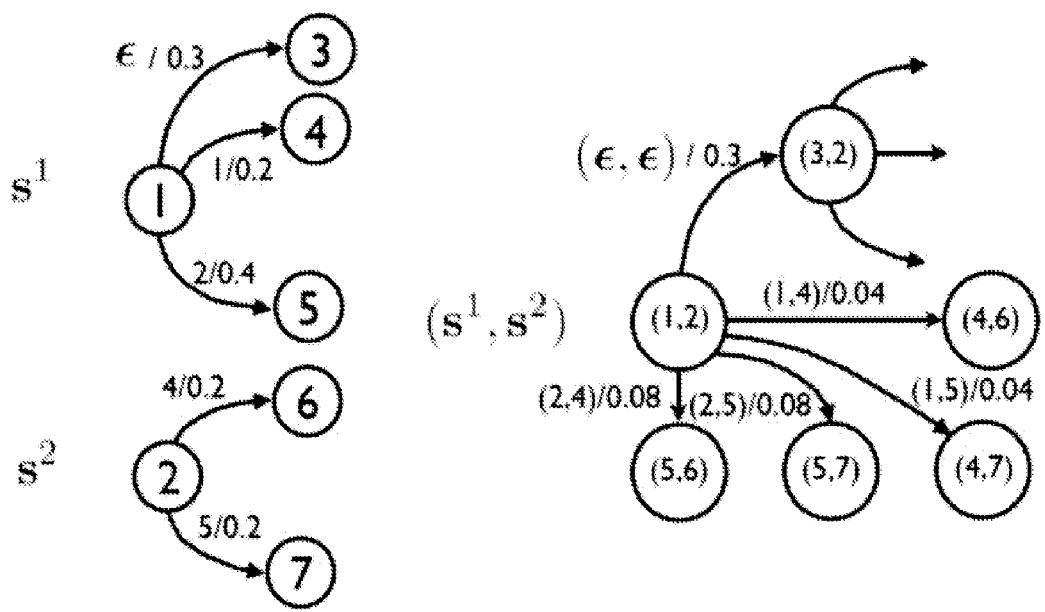
FIG. 4 is a block diagram of an exemplary system for single channel mixed speech recognition, according to embodiments described herein.

FIG. 4 is a block diagram of an exemplary system for single channel mixed speech recognition, according to embodiments described herein. FIG. 4 shows a toy example illustrating the joint token passing. On the two WFST graph: $s^1$, $s^2$ denote state space corresponds to one of two speakers; $(s^1, s^2)$ representing the joint state space. Supposing the token for the first speaker, $S_1$, is at state 1, and the token associated with the second speaker, $S_2$, is at state 2. For the outgoing arcs with non-E input labels (those arcs that consume acoustic frames), the expanded arcs represent the Cartesian product between the two outgoing arc sets. The graph cost of each expanded arc is the semiring multiplication of the two. The acoustic cost of each expanded arc is computed using the senone hypotheses from the two neural networks 104 for the instantaneous high and low energy. Both cases—where either one of the two sources has the higher energy—are considered. The acoustic cost is given by the combination with higher likelihood, $$\mathcal{C} = \max \{p(x_t|s^1; \theta^H) \cdot p(x_t|s^2; \theta^L), p(x_t|s^1; \theta^L) \cdot p(x_t|s^2; \theta^H)\}. \tag{7}$$

With Equation 7, it is also possible to determine tell which speaker has higher energy in the corresponding signal at certain frame t along this search path. For the arcs with ε input labels, the ε arcs are not consuming acoustic frames. Thus, to guarantee the synchronization of the tokens on two decoding graphs, a new joint state for current frame is created. For example, see the state (3,2) in FIG. 4.

One potential issue of the joint decoder 112 is that it allows free energy switching frame by frame while decoding the whole utterance. Yet, in practice, energy switching does not typically occur frequently. Embodiments of the claimed subject matter address this issue by introducing a constant penalty in the searching path where the louder signal has changed from last frame. Alternatively, the probability that a certain frame is the energy switching point can be estimated, and the value of the penalty may be adaptively changed with it. Since the training set 102 is created by mixing the speech signals, the energy of each original speech frame is available. The training set can be used to train a neural network 104 to predict whether the energy switch point occurs at certain frame. Let $\theta^S$ represent the models trained to detect the energy switching point, the adaptive penalty on energy switching is given by, $$\mathcal{P} = -\alpha \cdot \log p(y_t|x_t; \theta^S). \tag{8}$$

4. EXPERIMENTS

4.1. Example Implementation

In an example implementation, the speech data is drawn from GRID corpus. The training set 102 contains 17,000 clean speech utterances from 34 difference speakers (500 utterances for each speaker). The evaluation set includes 4,200 mixed speech utterances in 7 conditions, clean, 6 dB, 3 dB, 0 dB, −3 dB, −6 dB, −9 dB target-to-mask ratio (TMR), and the development set contains 1,800 mixed speech utterances in 6 conditions (no clean condition). The fixed grammar contains six parts: command, color, preposition, letter (with W excluded), number, and adverb, e.g. "place white at L 3 now". During the test phase, the speaker who utters the color 'white' is treated as the target speaker. The evaluation metric is the WER on letters and numbers spoken by the target speaker. Note that the WER on all words is lower, and unless otherwise specified, all reported WERs in the following experiments are the ones evaluated only on letters and numbers.

4.2. Baseline System

The baseline system is built using a DNN trained on the original training set consisting of 17,000 clean speech utterances. A GMM-HMM system was trained using 39-dimension MFCCs features with 271 distinct senones. Additionally, 64 dimension log mel-filterbank were used as a feature, and a context window of 9 frames to train the DNN. The DNN has 7 hidden layers with 1024 hidden units at each layer and the 271-dimensional softmax output layer, corresponding to the senones of the GMM-HMM system. This training scheme was used through all the DNN experiments. The parameter initialization is done layer by layer using generative pre-training followed by discriminative pre-training. The network is discriminatively trained using back-propagation. The mini-batch size is set to 256 and the initial learning rate is set to 0.008. After each training epoch, the frame accuracy is validated on the development set. If the improvement is less than 0.5%, the learning rate is decreased by a factor of 0.5. The training process is stopped after the frame accuracy improvement is less than 0.1%. The WERs of the baseline GMM-HMM and DNN-HMM system are shown in Table 2. As shown, the DNN-HMM system trained on clean data performs poorly in all SNR conditions except the clean condition, indicating the advantage of DNN multi-style training.

TABLE 2

| Systems | Conditions | | | | | | |
|---|---|---|---|---|---|---|---|
| | Clean | 6 dB | 3 dB | 0 dB | −3 dB | −6 dB | −9 dB |
| GMM | 4.0 | 38.5 | 54.7 | 70.5 | 82.3 | 89.3 | 94.2 |
| DNN | 0.7 | 32.5 | 48.8 | 66.3 | 78.4 | 86.3 | 91.8 |

4.3. Multi-Style Trained DNN Systems

To investigate the use of multi-style training for the high and low energy signal models, two mixed-speech training datasets were generated. The high energy training set, referred to as Set I, was created as follows: for each clean utterance, three other utterances were randomly selected, and mixed with the target clean utterance under 4 conditions, clean, 6 dB, 3 dB, 0 dB. (17,000×12). Set II, the low energy training set, was created in a similar manner but the mixing was done under 5 conditions, clean, and TMRs of 0 dB, −3 dB, −6 dB, −9 dB. (17,000×15). These two training sets 102 were used to train two DNN models, DNN I and II, for high and low energy signals respectively. The results are listed in Table 3.

TABLE 3

| Systems | Conditions | | | | | | |
|---|---|---|---|---|---|---|---|
| | 6 dB | 3 dB | 0 dB | −3 dB | −6 dB | −9 dB | AVG |
| DNN | 32.5 | 48.8 | 66.3 | 78.4 | 86.3 | 91.8 | 67.4 |
| DNN I | 4.5 | 16.8 | 56.8 | — | — | — | — |
| DNN II | — | — | 52.6 | 33.6 | 18.4 | 17.4 | — |
| IBM [2] | 15.4 | 17.8 | 22.7 | 20.8 | 22.1 | 30.9 | 21.6 |
| DNN I + II | 4.5 | 16.9 | 49.8 | 39.8 | 21.7 | 19.6 | 25.4 |

From the table, the results are good in the cases where two mixing signals have large energy level difference, i.e. 6 dB, −6 dB, −9 dB. Further, by combining the results from DNN I and II systems using the rule that the target speaker always utters the color white, the combined DNN I+II system achieves 25.4% WER compared to 67.4%, obtained with the DNN trained only on clean data.

With the same training set I, a DNN is trained as a front-end denoiser. With the trained deep denoiser, two different setups were tried: the first directly feeds denoised features to the DNN trained on the clean data. In the second setup, another DNN was retrained on the denoised data. The results of both setups are shown in Table 4.

TABLE 4

| Systems | Conditions | | |
|---|---|---|---|
| | 6 dB | 3 dB | 0 dB |
| Denoiser I + DNN | 16.8 | 32.2 | 65.9 |
| Denoiser I + DNN (retained) | 6.3 | 17.3 | 56.3 |
| DNN I | 4.5 | 16.8 | 56.8 |

From the above experiments, it appears the system with the DNN trained to predict senone labels is slightly better than the one with a trained deep denoiser, followed by another retrained DNN. This implies that DNN is capable of learning robust representations automatically. As such, hand-crafted features may not be extracted in the front-end. The combined system DNN I+II is still not good as the state-of-the-art. This appears to be because the system performs very poorly in cases where two mixing signals have very close energy levels, i.e. 0 dB, −3 dB. Specifically, the multi-style training strategy for the high and low energy signals has the potential issue of assigning conflicting labels during training. Table 4 shows WERs (%) of deep denoisers for high and low energy signals.

For the high and low pitch signals models, the pitch is estimated for each speaker from the clean training set. Then, Training Set I and Training Set II are combined to form Training Set III (17,000×24) to train two neural networks 104 for high and low pitch signals, respectively. When training the neural networks 104 for the high pitch signals, the label is assigned from the alignments on clean speech utterances corresponding to the high pitch talker. When training the neural networks 104 for the low pitch signals, the label from is assigned from the alignments corresponding to the low pitch talker. With the two trained networks 106, the decoding is performed independently as before. Specifically, the decoding results are combined using the rules that the target speaker always utters the color white. The WERs are shown in Table 5.

TABLE 5

| Systems | Conditions | | | | | | |
|---|---|---|---|---|---|---|---|
| | 6 dB | 3 dB | 0 dB | −3 dB | −6 dB | −9 dB | AVG |
| DNN I + II | 4.5 | 16.9 | 49.8 | 39.8 | 21.7 | 19.6 | 25.4 |
| DNN III | 15.5 | 22.1 | 30.8 | 41.9 | 52.8− | 59.6 | 36.9 |

As shown, the system with the high and low pitch signal models performs better than the one with the high and low energy models in the 0 dB case, but worse in the other cases.

4.4. DNN System with Joint Decoder

Training set III was also used to train two DNN models for instantaneous high and low energy signals as described in Section 3. With these two trained models, a joint decoding is performed as described in Section 3. The results of this Joint Decoder approach are shown in Table 6. The last two systems correspond to the cases where the energy switching penalties are introduced. The Joint Decoder I is the system with the constant energy switching penalty and Joint Decoder II is the system with adaptive switching penalty. To get the value of the energy switching penalties as defined in (8), a DNN was trained to estimate an energy switching probability for each frame. Table 6 shows WERs (%) of the DNN systems with the joint decoders.

TABLE 6

| Systems | Conditions | | | | | | |
|---|---|---|---|---|---|---|---|
| | 6 dB | 3 dB | 0 dB | −3 dB | −6 dB | −9 dB | AVG |
| DNN | 32.5 | 48.8 | 66.3 | 78.4 | 86.3 | 91.8 | 67.4 |
| IBM [2] | 15.4 | 17.8 | 22.7 | 20.8 | 22.1 | 30.9 | 21.6 |
| DNN I + II | 4.5 | 16.9 | 49.8 | 39.8 | 21.7 | 19.6 | 25.4 |
| Joint Decoder | 18.3 | 19.8 | 19.3 | 21.3 | 23.2 | 27.4 | 21.5 |
| Joint Decoder I | 16.1 | 18.7 | 20.5 | 19.6 | 23.6 | 26.8 | 20.9 |
| Joint Decoder II | 16.5 | 17.1 | 19.9 | 18.8 | 22.5 | 25.3 | 20.0 |
| Combined | 16.0 | 16.6 | 19.7 | 18.8 | 23.0 | 24.1 | 19.7 |

4.5. System Combination

Table 6 shows that the DNN I+II system performs well in the cases where two mixing speech signals have large energy level difference, i.e. 6 dB, −6 dB, −9 dB, while the Joint Decoder II system performs well in the cases where two mixing signals have similar energy level. This suggest the system combination according to the energy difference between the two signals may be used. The mixed signal is input to the two deep denoisers, and the two resultant output signals are used to estimate the high and low energy signals. Using these separated signals, the energy ratio may be calculated to approximate the energy difference of two original signals. A threshold is tuned and obtained for the energy ratio on the development set, and uses for the system combination, i.e. if the energy ratio of two separated signals from the denoisers is higher than the threshold, use system DNN I+II to decode the test utterance, otherwise the system Joint Decoder II is used. The results are listed in Table 6.

5. CONCLUSIONS

In this work, we investigate DNN-based systems for single-channel mixed speech recognition by using multi-style training strategy. We also introduce a WFST-based joint decoder to work with the trained neural networks 104. Experiments on the 2006 speech separation and recognition challenge data demonstrate that the proposed DNN based system has remarkable noise robustness to the interference of competing speaker. The best setup of our proposed systems achieves 19.7% overall WER which improves upon the results obtained by the IBM superhuman system by 1.9% absolute, with making fewer assumptions and lower computational complexity.

Figure 5:
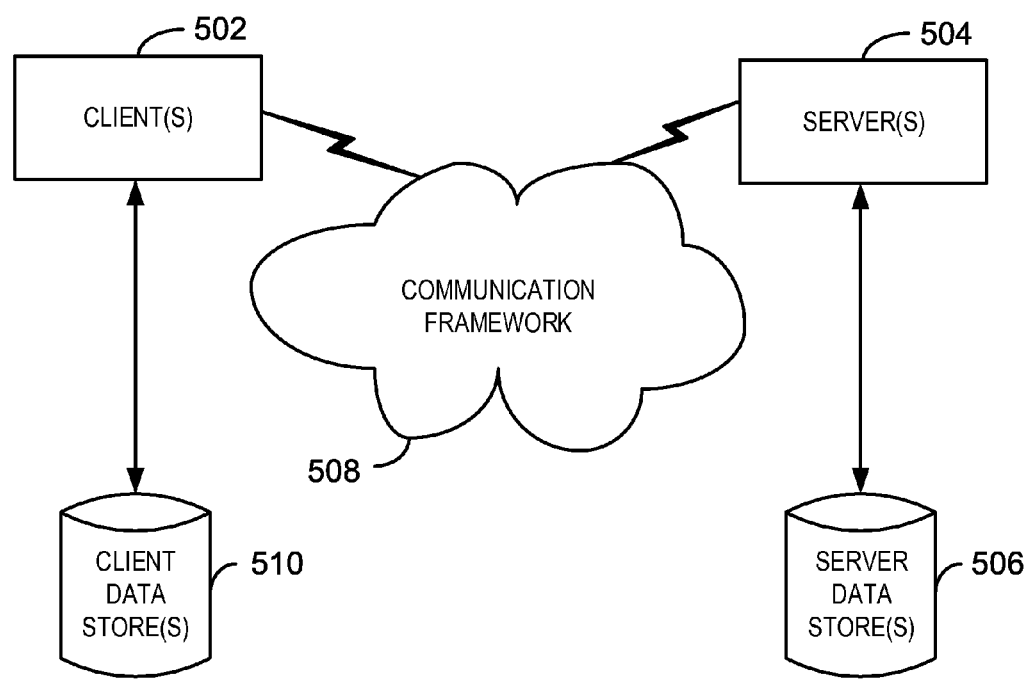
FIG. 5 is a block diagram of an exemplary networking environment for implementing various aspects of the claimed subject matter.

FIG. 5 is a block diagram of an exemplary networking environment 500 for implementing various aspects of the claimed subject matter. Moreover, the exemplary networking environment 500 may be used to implement a system and method that process external datasets with a DBMS engine.

The networking environment 500 includes one or more client(s) 502. The client(s) 502 can be hardware and/or software (e.g., threads, processes, computing devices). As an example, the client(s) 502 may be client devices, providing access to server 504, over a communication framework 508, such as the Internet.

The environment 500 also includes one or more server(s) 504. The server(s) 504 can be hardware and/or software (e.g., threads, processes, computing devices). The server(s) 504 may include a server device. The server(s) 504 may be accessed by the client(s) 502.

One possible communication between a client 502 and a server 504 can be in the form of a data packet adapted to be transmitted between two or more computer processes. The environment 500 includes a communication framework 508 that can be employed to facilitate communications between the client(s) 502 and the server(s) 504.

The client(s) 502 are operably connected to one or more client data store(s) 510 that can be employed to store information local to the client(s) 502. The client data store(s) 510 may be located in the client(s) 502, or remotely, such as in a cloud server. Similarly, the server(s) 504 are operably connected to one or more server data store(s) 506 that can be employed to store information local to the servers 504.

Figure 6:
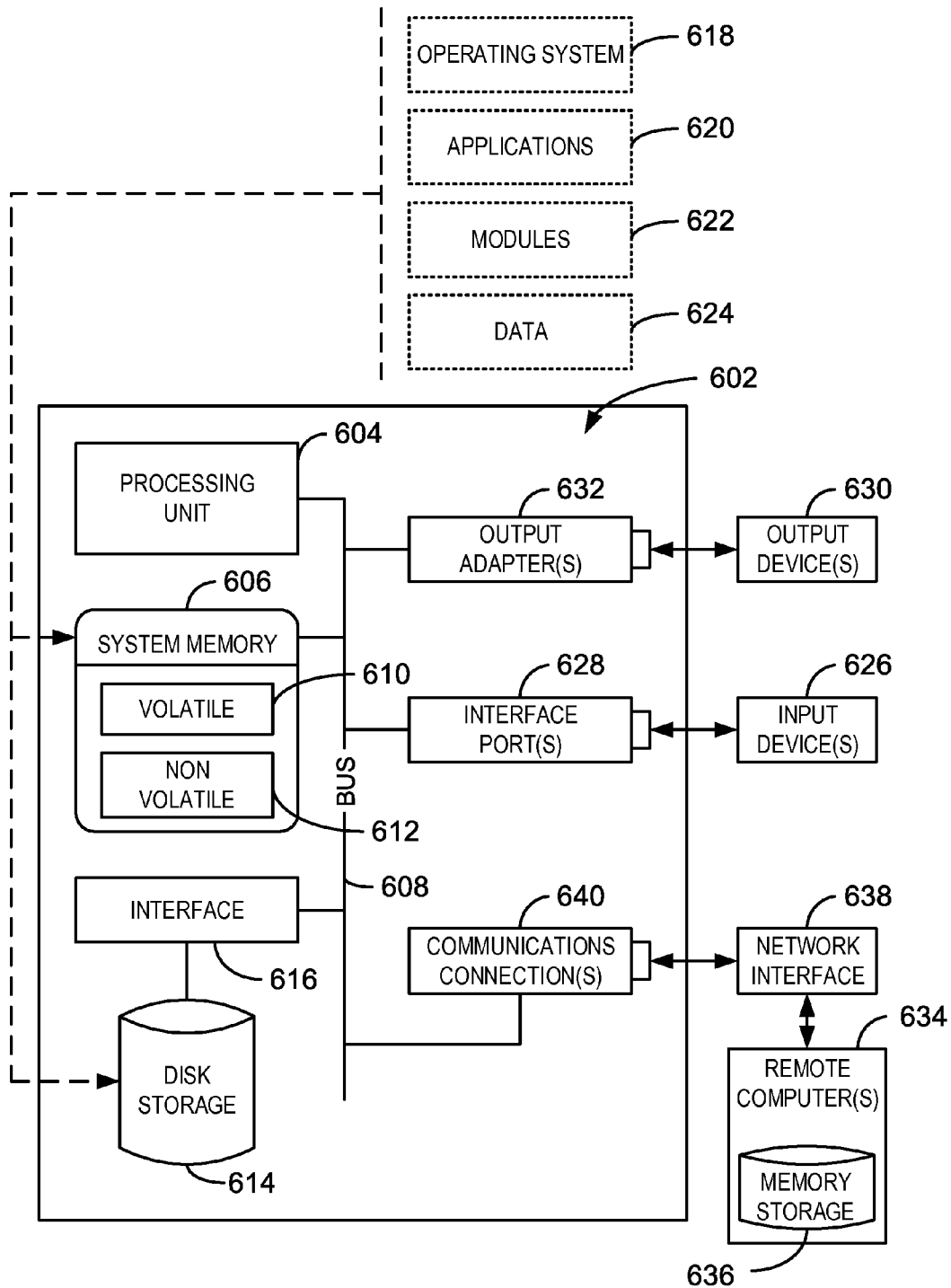
FIG. 6 is a block diagram of an exemplary operating environment for implementing various aspects of the claimed subject matter.

In order to provide context for implementing various aspects of the claimed subject matter, FIG. 6 is intended to provide a brief, general description of a computing environment in which the various aspects of the claimed subject matter may be implemented. For example, a method and system for fabricating full color 3D objects can be implemented in such a computing environment. While the claimed subject matter has been described above in the general context of computer-executable instructions of a computer program that runs on a local computer or remote computer, the claimed subject matter also may be implemented in combination with other program modules. Generally, program modules include routines, programs, components, data structures, or the like that perform particular tasks or implement particular abstract data types.

FIG. 6 is a block diagram of an exemplary operating environment 600 for implementing various aspects of the claimed subject matter. The exemplary operating environment 600 includes a computer 602. The computer 602 includes a processing unit 604, a system memory 606, and a system bus 608.

The system bus 608 couples system components including, but not limited to, the system memory 606 to the processing unit 604. The processing unit 604 can be any of various available processors. Dual microprocessors and other multiprocessor architectures also can be employed as the processing unit 604.

The system bus 608 can be any of several types of bus structure, including the memory bus or memory controller, a peripheral bus or external bus, and a local bus using any variety of available bus architectures known to those of ordinary skill in the art. The system memory 606 includes computer-readable storage media that includes volatile memory 610 and nonvolatile memory 612.

The basic input/output system (BIOS), containing the basic routines to transfer information between elements within the computer 602, such as during start-up, is stored in nonvolatile memory 612. By way of illustration, and not limitation, nonvolatile memory 612 can include read only memory (ROM), programmable ROM (PROM), electrically programmable ROM (EPROM), electrically erasable programmable ROM (EEPROM), or flash memory.

Volatile memory 610 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 602 also includes other computer-readable media, such as removable/non-removable, volatile/non-volatile computer storage media. FIG. 6 shows, for example a disk storage 614. Disk storage 614 includes, but is not limited to, devices like a magnetic disk drive, floppy disk drive, tape drive, Jaz drive, Zip drive, LS-210 drive, flash memory card, or memory stick.

In addition, disk storage 614 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 614 to the system bus 608, a removable or non-removable interface is typically used such as interface 616.

It is to be appreciated that FIG. 6 describes software that acts as an intermediary between users and the basic computer resources described in the suitable operating environment 600. Such software includes an operating system 618. Operating system 618, which can be stored on disk storage 614, acts to control and allocate resources of the computer system 602.

System applications 620 take advantage of the management of resources by operating system 618 through program modules 622 and program data 624 stored either in system memory 606 or on disk storage 614. It is to be appreciated that the claimed subject matter can be implemented with various operating systems or combinations of operating systems.

A user enters commands or information into the computer 602 through input devices 626. Input devices 626 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. The input devices 626 connect to the processing unit 604 through the system bus 608 via interface ports 628. Interface ports 628 include, for example, a serial port, a parallel port, a game port, and a universal serial bus (USB).

Output devices 630 use some of the same type of ports as input devices 626. Thus, for example, a USB port may be used to provide input to the computer 602, and to output information from computer 602 to an output device 630.

Output adapter 632 is provided to illustrate that there are some output devices 630 like monitors, speakers, and printers, among other output devices 630, which are accessible via adapters. The output adapters 632 include, by way of illustration and not limitation, video and sound cards that provide a means of connection between the output device 630 and the system bus 608. It can be noted that other devices and systems of devices provide both input and output capabilities such as remote computers 634.

The computer 602 can be a server hosting various software applications in a networked environment using logical connections to one or more remote computers, such as remote computers 634. The remote computers 634 may be client systems configured with web browsers, PC applications, mobile phone applications, and the like.

The remote computers 634 can be a personal computer, a server, a router, a network PC, a workstation, a microprocessor based appliance, a mobile phone, a peer device or other common network node and the like, and typically includes many or all of the elements described relative to the computer 602.

For purposes of brevity, a memory storage device 636 is illustrated with remote computers 634. Remote computers 634 is logically connected to the computer 602 through a network interface 638 and then connected via a wireless communication connection 640.

Network interface 638 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connections 640 refers to the hardware/software employed to connect the network interface 638 to the bus 608. While communication connection 640 is shown for illustrative clarity inside computer 602, it can also be external to the computer 602. The hardware/software for connection to the network interface 638 may include, for exemplary purposes, internal and external technologies such as, mobile phone switches, modems including regular telephone grade modems, cable modems and DSL modems, ISDN adapters, and Ethernet cards.

An exemplary processing unit 604 for the server may be a computing cluster comprising Intel® Xeon CPUs. The disk storage 614 may comprise an enterprise data storage system, for example, holding thousands of impressions.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method performed by a computer processor for recognizing mixed speech from a source, comprising:
    training a first neural network to recognize a speech signal spoken by a speaker with a higher level of a speech characteristic from a mixed speech sample;
    training a second neural network to recognize a speech signal spoken by a speaker with a lower level of the speech characteristic from the mixed speech sample, wherein the lower level is lower than the higher level; and
    decoding the mixed speech sample with the first neural network and the second neural network by optimizing the joint likelihood of observing the two speech signals.

2. The method of claim 1, comprising decoding by considering a probability that a specific frame is a switching point of the speakers.

3. The method of claim 2, comprising compensating for the switching point occurring in a decoding process based on the switching probability estimated from another neural network.

4. The method of claim 1, the mixed speech sample comprising a single audio channel, the single audio channel being generated by a microphone.

5. The method of claim 1, the speech characteristic comprising one of:
instantaneous energy in a frame of the mixed speech sample;
energy; and
pitch.

6. The method of claim 1, comprising:
training a third neural network to predict speech characteristic switching;
predicting whether energy is switching from one frame to a next frame; and
decoding the mixed speech sample based on the prediction.

7. The method of claim 6, comprising weighting against the likelihood of energy switching in a frame subsequent to a frame where energy switching is predicted.

8. A system for recognizing mixed speech from a source, the system comprising:
a first neural network comprising a first plurality of interconnected systems; and
a second neural network comprising a second plurality of interconnected systems, each interconnected system, comprising:
a processing unit; and
a system memory, wherein the system memory comprises code configured to direct the processing unit to:
train the first neural network to recognize a higher level of a speech characteristic in a first speech signal from a mixed speech sample;
train the second neural network to recognize a lower level of the speech characteristic in a second speech signal from the mixed speech sample, wherein the lower level is lower than the higher level; and
decode the mixed speech sample with the first neural network and the second neural network by optimizing the joint likelihood of observing the two speech signals.

9. The system of claim 8, comprising code configured to decode the mixed speech sample by considering a probability that a specific frame is a switching point of the speech characteristic.

10. The system of claim 8, comprising code configured to direct the processing unit to compensate for the switching point occurring in a decoding process based on the probability estimated from a neural network.

11. The system of claim 8, the first neural network and the second neural network comprising deep neural networks.

12. The system of claim 8, the speech characteristic comprising a selected one of pitch, energy, and instantaneous energy, in a frame of the mixed speech sample.

13. The system of claim 8, comprising code configured to direct the processing unit to:
train a third neural network to predict energy switching;
predict whether energy is switching from one frame to a next frame; and
decode the mixed speech sample based on the prediction.

14. The system of claim 13, comprising weighting against the likelihood of energy switching in a frame subsequent to a frame where energy switching is predicted.

15. One or more computer-readable storage memory devices for storing computer-readable instructions, the computer-readable instructions when executed by one or more processing devices, the computer-readable instructions comprising code configured to:
train a first neural network to recognize a higher level of a speech characteristic in a first speech signal from a mixed speech sample comprising a single audio channel;
train a second neural network to recognize a lower level of the speech characteristic in a second speech signal from the mixed speech sample;
train a third neural network to estimate a switching probability for each frame; and
decode the mixed speech sample with the first neural network, the second neural network, and the third neural network by optimizing the joint likelihood of observing the two speech signals, the joint likelihood meaning a probability that a specific frame is a switching point of the speech characteristic.

16. The computer-readable storage memory devices of claim 15, comprising code configured to decode the mixed speech sample by considering a probability that a specific frame is a switching point of the speech characteristic.

17. The computer-readable storage memory devices of claim 15, comprising code configured to compensate for the switching point occurring in a decoding process based on the joint likelihood.

18. The computer-readable storage memory devices of claim 15, wherein the speech characteristic is a selected one of energy, pitch, and instantaneous energy in a frame of the mixed speech sample.

19. The computer-readable storage memory devices of claim 15, wherein the speech characteristic is instantaneous energy in a frame of the mixed speech sample.

20. The computer-readable storage memory devices of claim 15, comprising code configured to:
train a third neural network to predict energy switching;
predict whether energy is switching from one frame to a next frame; and
decode the mixed speech sample based on the prediction.

* * * * *